US012584349B2

(12) United States Patent
Widner

(10) Patent No.: US 12,584,349 B2
(45) Date of Patent: Mar. 24, 2026

(54) PET DOOR INSERTS FOR WINDOW FRAMES AND SLIDING DOORS

(71) Applicant: Alexander Widner, Portland, OR (US)

(72) Inventor: Alexander Widner, Portland, OR (US)

( * ) Notice: Subject to any disclaimer, the term of this patent is extended or adjusted under 35 U.S.C. 154(b) by 61 days.

(21) Appl. No.: 19/056,333

(22) Filed: Feb. 18, 2025

(65) Prior Publication Data

US 2025/0188795 A1 Jun. 12, 2025

(51) Int. Cl.
*E06B 7/32* (2006.01)

(52) U.S. Cl.
CPC .................................... *E06B 7/32* (2013.01)

(58) Field of Classification Search
CPC .................................... E06B 7/03; E06B 7/32
See application file for complete search history.

(56) References Cited

U.S. PATENT DOCUMENTS 3,464,158 A * 9/1969 Greene .................... E06B 7/32 160/180
3,654,733 A * 4/1972 Blackwell ................ E06B 7/32 49/67
3,811,224 A * 5/1974 Garrison .................. E06B 7/32 160/180
3,878,645 A * 4/1975 Porter ...................... E06B 7/32 49/169
5,185,954 A * 2/1993 Waddle, Sr. ............. E06B 7/32 49/168
5,842,438 A * 12/1998 Messmer ............ A01K 13/002 119/484
5,946,855 A * 9/1999 Miconi .................... E06B 7/32 160/180
6,691,483 B2 * 2/2004 Lethers ................... E06B 7/32 49/169
7,150,244 B2 * 12/2006 Dawes ..................... E06B 7/32 119/484
7,207,141 B2 * 4/2007 Sullivan .................. E06B 7/32 160/205
8,333,037 B2 * 12/2012 Sullivan .................. E06B 7/32 160/90
(Continued)

FOREIGN PATENT DOCUMENTS

GB 2351754 A * 1/2001 .............. E06B 7/32
KR 102267454 B1 * 6/2021 .............. E06B 7/32
(Continued)

*Primary Examiner* — Ebony E Evans
(74) *Attorney, Agent, or Firm* — Mohr Intellectual Property Law Solutions, PC

(57) ABSTRACT

Pet door inserts including a base panel system and an adjustment panel system. The base panel system includes a first and second base panels, a pet door, and a track. The pet door moveably mounts to the first base panel within a pet door opening and selectively covers the pet door opening. The second base panel is coupled to the first base panel along a first lateral side of the second base panel. The track extends longitudinally along a medial portion of the second base panel. The adjustment panel system is moveably mounted on the track and translates relative to the base panel system. The adjustment panel system includes a first adjustment panel defining a horizontal groove extending longitudinally along a medial portion of the first adjustment panel. The horizontal groove selectively receives the track to selectively mount the adjustment panel system to the base panel system.

20 Claims, 10 Drawing Sheets

(56) References Cited

U.S. PATENT DOCUMENTS

| | | | | | |
|---|---|---|---|---|---|
| D903,903 | S * | 12/2020 | Vanderbilt-Kay | .......... | D25/48.3 |
| 11,525,299 | B2 * | 12/2022 | Vanderbilt-Kay | ........ | E06B 7/32 |
| 2004/0113796 | A1 * | 6/2004 | Noyes | .................... | A01K 1/035<br>340/573.3 |

FOREIGN PATENT DOCUMENTS

| | | | | | |
|---|---|---|---|---|---|
| WO | WO-2006022605 | A1 * | 3/2006 | ............... | E06B 7/32 |
| WO | WO-2016126067 | A1 * | 8/2016 | ......... | E05D 15/0643 |

* cited by examiner

PET DOOR INSERTS FOR WINDOW FRAMES AND SLIDING DOORS

BACKGROUND

The present disclosure relates generally to pet doors. In particular, pet door inserts for window frames and sliding doors are described.

A significant number of households have dogs or cats as pets. In many instances, the dogs and cats reside inside the home, but venture outside as well. For example, dogs and cats may be trained to relieve themselves outside.

Pet doors exist to enable dogs and cats to go outside and return inside without assistance from a human. Some pet doors are designed as inserts to fit within an open window or door. However, conventional pet doors are not entirely satisfactory.

For example, existing pet doors often must be custom tailored for a given size window or door opening. The custom nature of conventional pet doors means that pet owners must take accurate measurements of the opening where the pet door will be located and select the proper size pet door compatible with the opening sized measured.

A key limitation of conventional pet doors is that mismeasurements and/or selecting the wrong size pet door results in a pet door that is not suitable for the space available. The measurement and selection process can be intimidating and tedious. Selecting the wrong type or size of pet door is frustrating and can be expensive.

It would be desirable to have a pet door that was adjustable to facilitate use in a wide range of window and door openings of various sizes. Pet owners would appreciate being able to purchase an adjustable pet door with confidence it would be suitable for the opening size available without having to take detailed and accurate measurements.

Some conventional pet doors provide a limited range of adjustability, but are not sufficiently adjustable to represent a one-size-fits-all solution. Rather than being suitable for a wide range of window or door opening sizes, conventional pet doors with adjustment capabilities tend to have a limited range of adjustability. The limited range of adjustability means that even adjustable conventional pet doors are limited to a relatively narrow range of opening sizes.

Another limitation of conventional pet doors is that they do not provide adequate weather seals-especially when they provide some measure of adjustability. It would be advantageous if an adjustable pet door existed with effective weather seal capabilities over a range of lengths.

Thus, there exists a need for pet door inserts that improve upon and advance the design of known pet doors. Examples of new and useful pet door inserts relevant to the needs existing in the field are discussed below.

Examples of references relevant to pet door inserts include U.S. Patent References: U.S. Pat. Nos. 7,159,361, 7,207,141, 8,333,037, 11,274,491, US2008134584, and US2016262344. The complete disclosures of the above patents and patent applications are incorporated herein by reference for all purposes.

SUMMARY

The present disclosure is directed to pet door inserts for window frames or sliding doors. The pet door inserts include a base panel system and an adjustment panel system.

The base panel system includes a first base panel, a second base panel, a pet door, and a track. The first base panel defines a pet door opening. The pet door is moveably mounted to the first base panel within the pet door opening and configured to move between a pet door covered position covering the pet door opening and a pet door open position allowing a pet to pass through the pet door opening.

The second base panel is coupled to the first base panel along a first lateral side of the second base panel. The track extends longitudinally along a medial portion of the second base panel.

The adjustment panel system is moveably mounted on the track and adapted to translate relative to the base panel system to adjust the effective length of the pet door insert. The adjustment panel system overlaps the base panel system in a compact position and extends longitudinally beyond the base panel system in an extended position.

The adjustment panel system includes a first adjustment panel. The first adjustment panel defines a horizontal groove extending longitudinally along a medial portion of the first adjustment panel. The horizontal groove is complementarily configured with the track and selectively receives the track to selectively mount the adjustment panel system to the base panel system.

DETAILED DESCRIPTION

Figure 1:
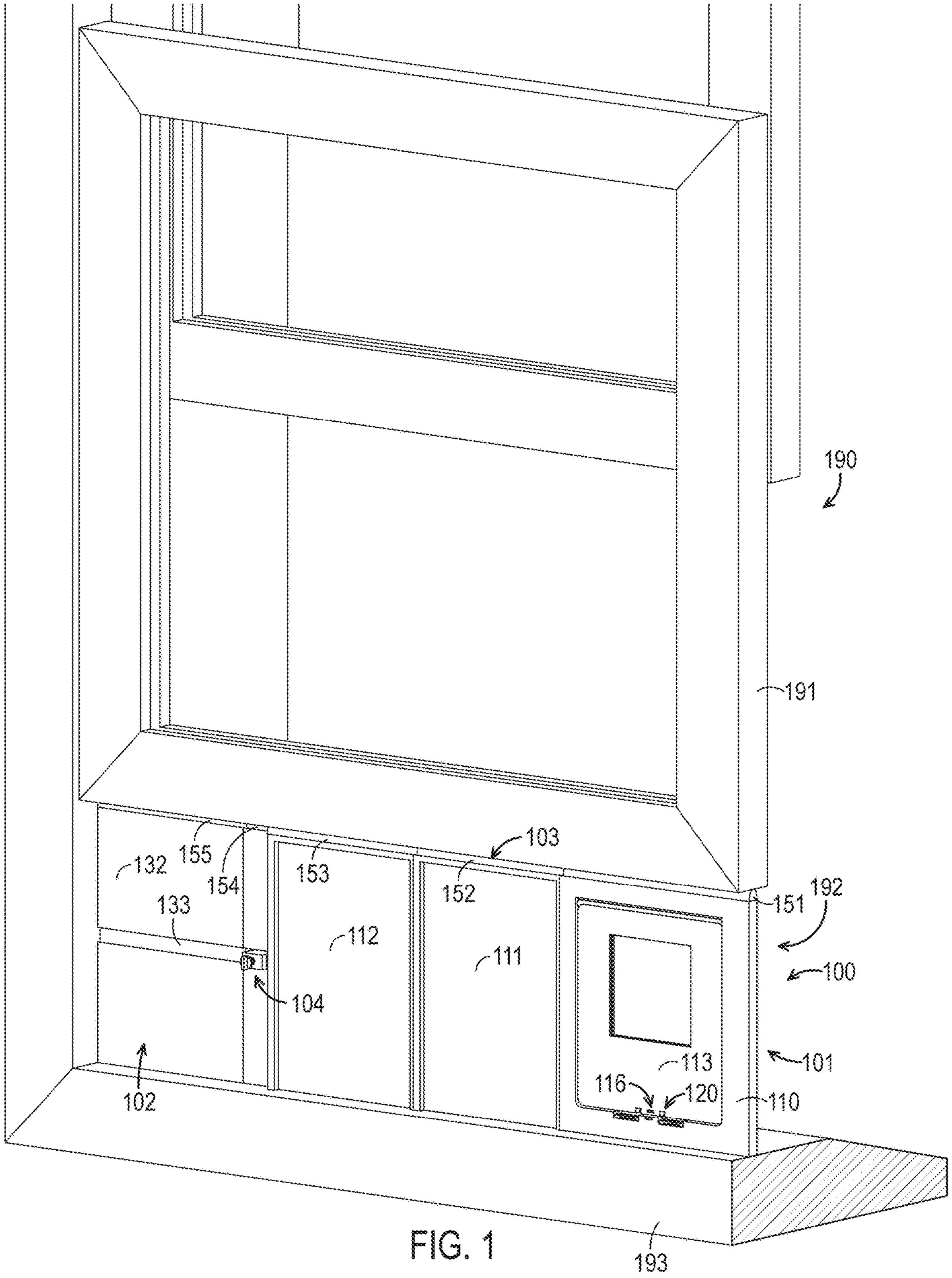
FIG. 1 is a front perspective view of a first example of a pet door insert installed horizontally in a window frame with a sash abutting the top of the pet door insert.

The disclosed pet door inserts will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various pet door inserts are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

Contextual Details

Ancillary features relevant to the pet door inserts described herein will first be described to provide context and to aid discussing the pet door inserts.

Windows and Sliding Doors

The pet door inserts described herein are intended to be mounted in window openings or sliding door openings. As apparent from FIG. 1, pet door insert 100 adjusts to fill the width of a window opening 192 of window 190. Window opening 192 is defined by the extent to which a sash 191 of window 190 is moved away from a bottom window frame 193.

As shown in FIG. 1, sash 191 may be closed sufficient to contact pet door insert 100 from above. When sash 191 contacts pet door insert 100 and pet door insert 100 is adjusted to extend across the width of window opening 192, window 190 is fully covered. In examples where a sash slides horizontally, the pet door insert adjusts to fill the height of the window opening, and the sash may be closed to contact a lateral side of the pet door insert.

Figure 9:
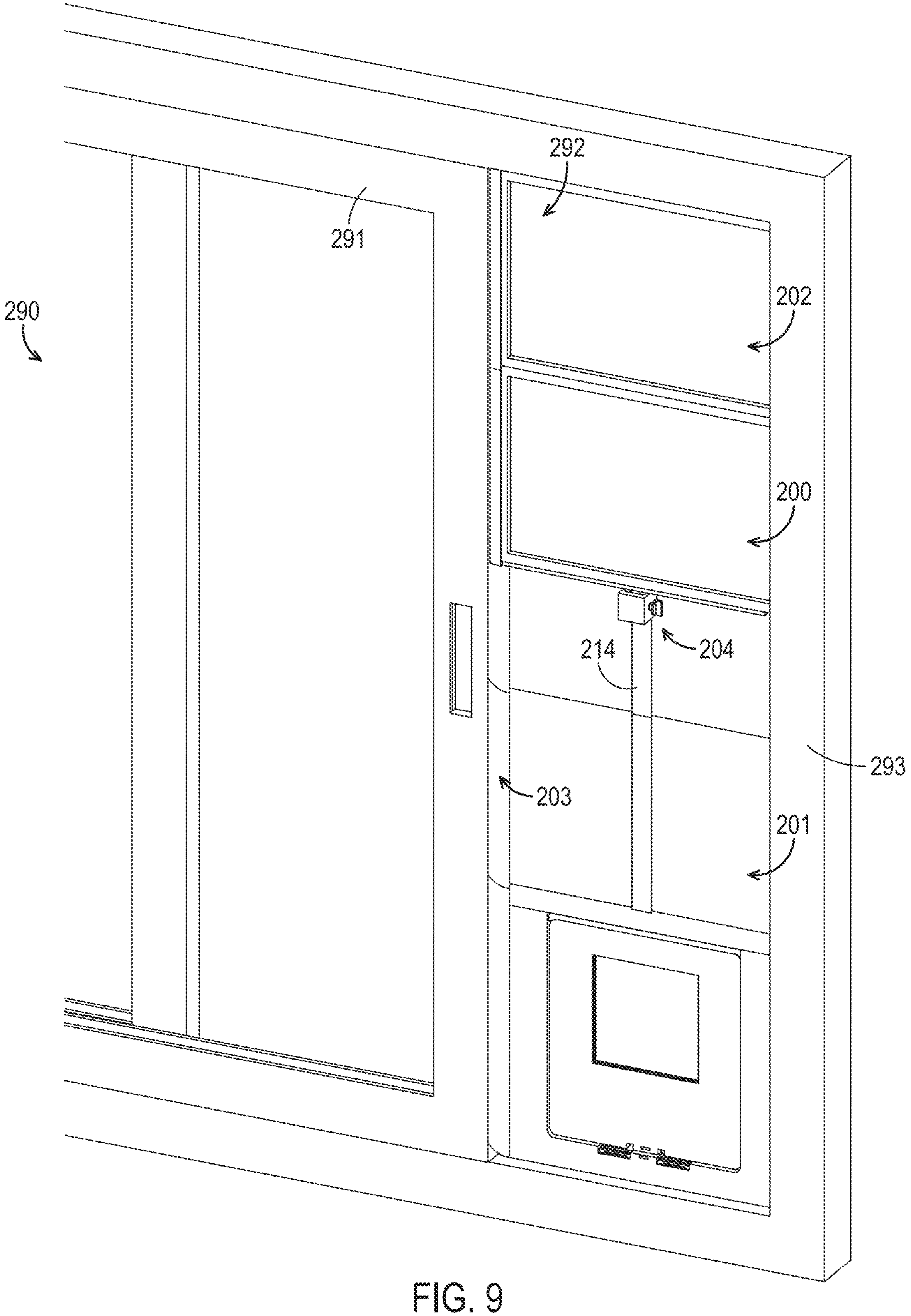
FIG. 9 is a rear perspective view of a second example of a pet door insert installed vertically in a sliding door frame with a door member abutting the pet door insert from the side.

With reference to FIG. 9, the reader can see that pet door insert 200 may mount in a door opening 292 of a sliding door 290. Door opening 292 is defined by a door member 291 sliding away from a door frame 293. Pet door insert 200 adjusts to fill the height of the door opening 292. Door member 291 may be closed sufficient to contact pet door insert 200 from a lateral side, which fully covers sliding door 290.

The pet door inserts may be used with any currently known or later developed type of window or door that slides open and closed. The window and door may slide vertically or horizontally. Often sliding doors are made primarily of glass, but may primarily be made from wood, metal, or polymers instead. The size and shape of the windows and doors may vary in different examples.

Pet Door Inserts for Window Frames and Sliding Doors

With reference to the figures, pet door inserts for window frames and sliding doors will now be described. The pet door inserts discussed herein function to enable pets to enter and exit a dwelling. Further, the pet door inserts function to adjustably fill the space available in an open window or sliding door over a wide range of dimensions.

The reader will appreciate from the figures and description below that the presently disclosed pet door inserts address many of the shortcomings of conventional pet door inserts. For example, the novel pet door inserts discussed herein are adjustable to facilitate use in a wide size range of window and door openings. As a result, the novel pet door inserts can be purchased with confidence that they will be suitable for a given size window or siding door opening without necessitating first taking detailed and accurate measurements of the opening.

Notably, the novel pet door inserts described in this document are sufficiently adjustable to represent a one-size-fits-all solution. The novel pet door inserts are suitable for a wide range of window or door opening sizes unlike conventional pet doors, which tend to have a limited range of adjustability.

Another benefit of the novel pet door inserts is that they provide good weather sealing capabilities over a wide range of adjustable lengths. Whether the novel pet door inserts are adjusted to span a long length or a short length, weather strip members included in the novel pet door inserts effectively form seals with an adjacent sash or door member.

Pet Door Insert Embodiment One

Figure 10A:
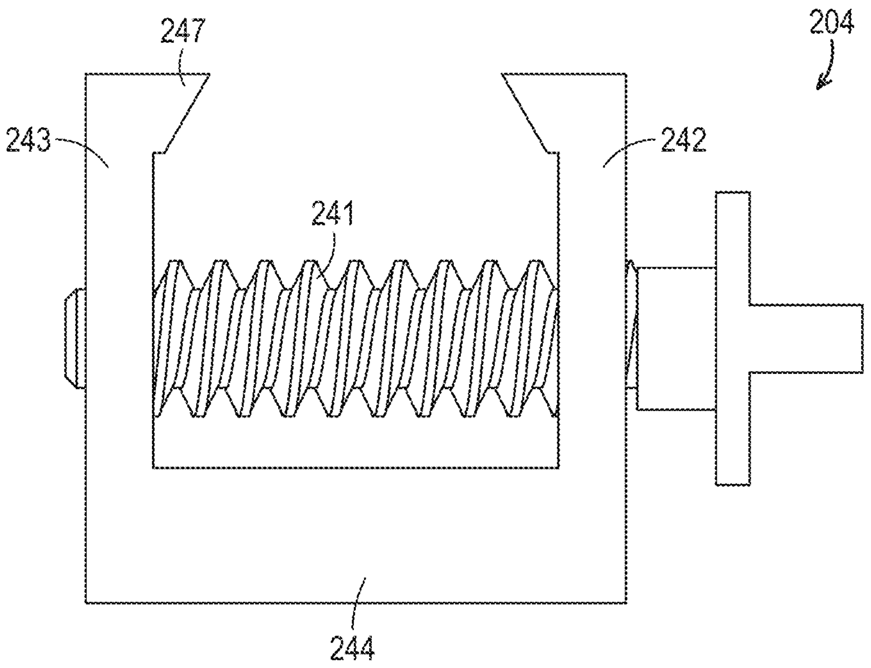
FIG. 10A is a side elevation view of an anchor included in the pet door insert shown in FIG. 9.
Figure 10B:
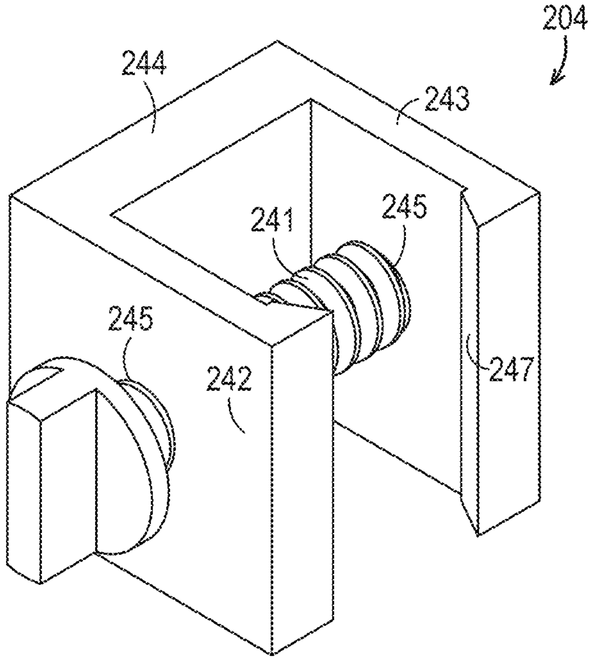
FIG. 10B is a perspective view of the anchor included in the pet door insert shown in FIG. 9.

With reference to FIGS. 1-8, a first example of a pet door insert, pet door insert 100, will now be described. A second example of a pet door insert, pet door insert 200, is shown in FIGS. 9, 10A, and 10B and discussed in the Embodiment Two section below.

Pet door insert 100 includes a base panel system 101, an adjustment panel system 102, a weather seal system 103, and an anchor 104. In some examples, the pet door insert does not include one or more features included in pet door insert 100. In other examples, the pet door insert includes additional or alternative features. The components of pet door insert 100 are discussed in the sections below.

The size and shape of the pet door insert may be different than shown in FIGS. 1-8. Some pet door insert examples are larger than pet door insert 100 while others are smaller. The length of pet door insert 100 is adjustable in two primary ways. One, adjustment panel system 102 is configured to move relative to base panel system 101 to modify the overall length of pet door insert 100. Two, panels may be selectively added or removed from base panel system 101 and/or adjustment panel system 102 to adjust the length of pet door insert 100.

Pet door insert 100 is primarily comprised of a polymer material. However, pet door inserts described in this document may be comprised of other materials or combinations of materials. For example, the pet door inserts may be comprised of wood, metal, polymers, or combinations thereof.

Base Panel System

Base panel system 101 functions to selectively allow a pet to enter and exit a dwelling. Further, base panel system 101 functions to moveably support adjustment panel system 102. Base panel system 101 and adjustment panel system 102 cooperate to cover window opening 192 of window 190 formed when sash 191 of window 190 is moved upwards away from bottom frame 193.

As shown in FIGS. 1-5, and 8, base panel system 101 includes a first base panel 110, a second base panel 111, a third base panel 112, a pet door 113, a track 114, a lock mechanism 120, and an orientation mechanism 116. In some example, the base panel system includes fewer components, such as including one or two base panels rather than three, not including a lock mechanism, and/or not including an orientation mechanism. In certain examples, the base panel system includes additional or alternative components. The components of base panel system 101 are described in the sections below.

Base Panels

The base panels cover a portion of window opening 192. Further, the base panels support other components of base panel system 101, including pet door 113, track 114, lock mechanism 120, and a portion of orientation mechanism 116.

In the present example, base panel system 101 includes three base panels 110-112. However, the base panel system may have additional or fewer base panels in other examples. For instance, the base panel system may include a single base panel, two base panels, or more than three base panels.

In base panel system 101, the base panels selectively couple together on lateral sides. For example, second base panel 111 selectively couples to first base panel 110 on a first lateral side of second base panel 111 and selectively couples to third base panel 112 on a second lateral side opposite the first lateral side. However, one or more base panels may be fixed together rather than selectively removable. Base panels 110-112 selectively couple together with a tongue-and-groove arrangement along their lateral sides, but may couple together by other means in other examples.

Figure 5:
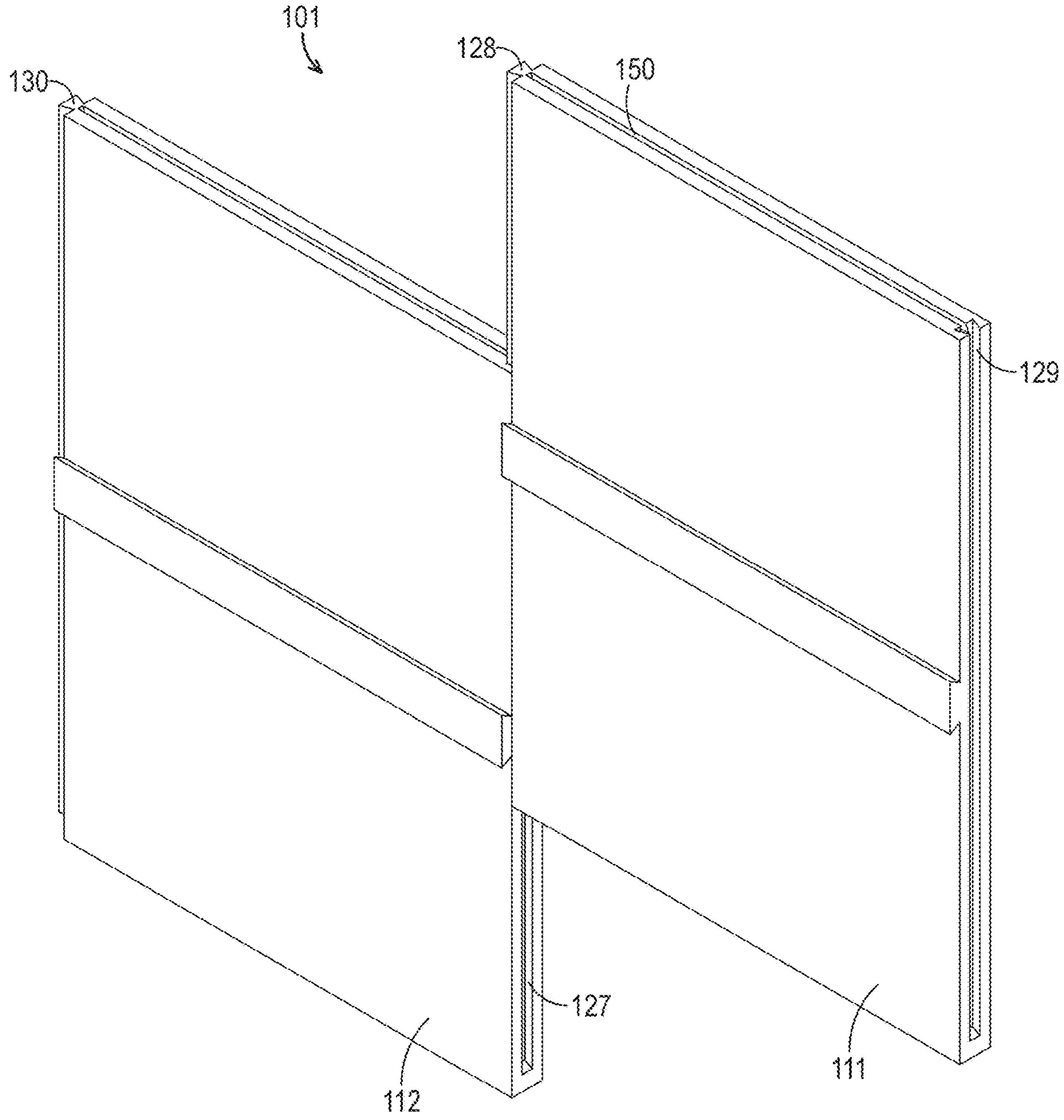
FIG. 5 is a perspective view of the base panel system depicting a second base panel partially attached to a third base panel via a coupling groove extending vertically on a lateral side of the third base panel.

FIG. 5 shows a coupling groove 127 defined by third base panel 112. Coupling groove 127 extends vertically on a lateral side of third base panel 112 proximate second base panel 111. Coupling groove 127 is complementarily configured with a tongue 128 defined by second base panel 111.

As shown in FIG. 5, tongue 128 is located on a first lateral side of second base panel 111. In particular, tongue 128 is located on a lateral side of second base panel 111 proximate coupling groove 127. Coupling groove 127 selectively receives tongue 128 to selectively couple second base panel 111 to third base panel 112.

Second base panel 111 couples to first base panel 110 on a second lateral side opposite its first lateral side via a coupling groove 129. Second base panel 111 and first base panel 112 selectively couple together with a tongue-and-groove arrangement configured the same as the tongue-and-groove arrangement selectively coupling third base panel 112 and second base panel 111. The reader can see in FIG. 5 that third base panel 112 includes a tongue 130 to selectively couple with a coupling groove of another base panel.

Figure 8:
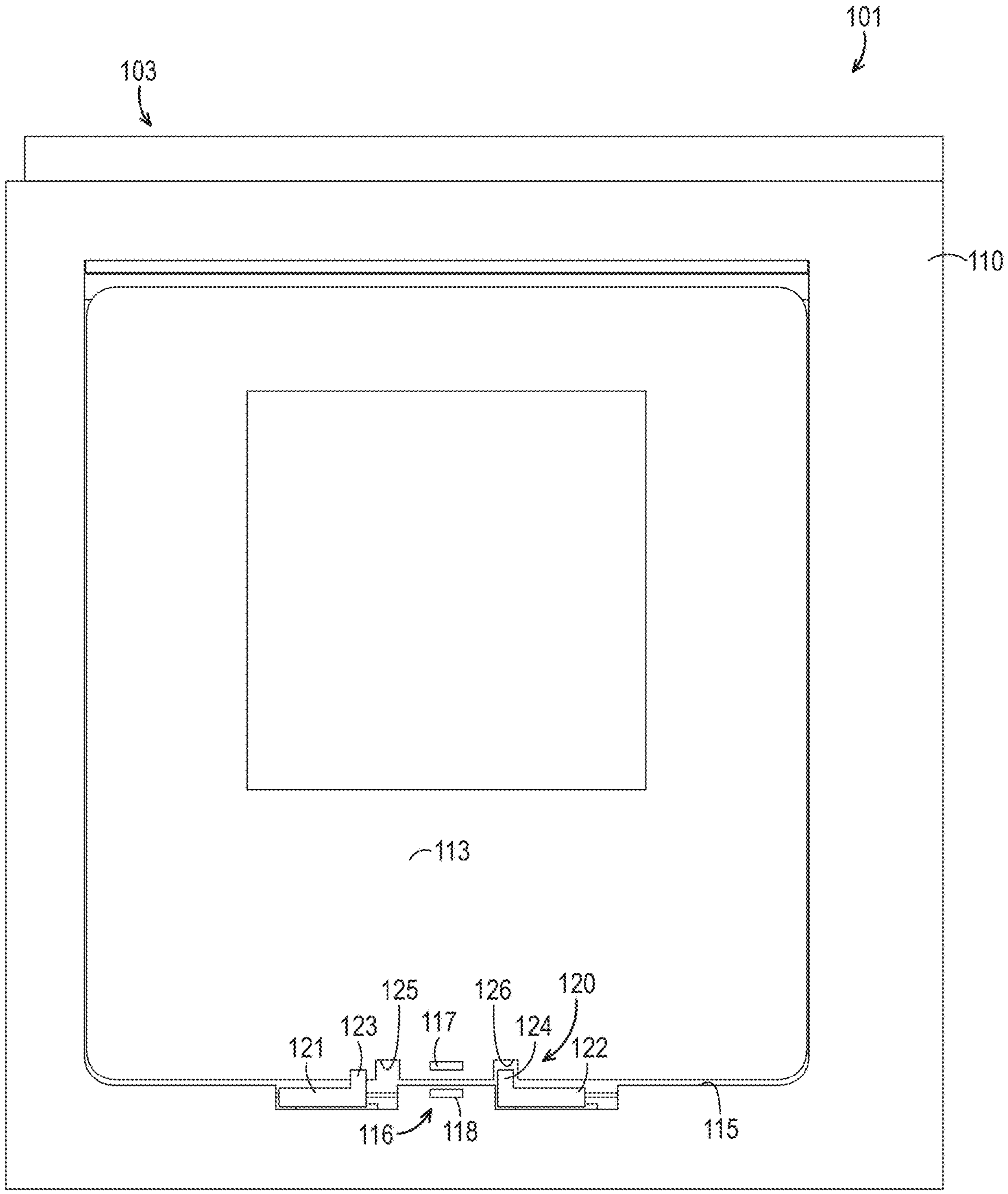
FIG. 8 is a front elevation view of a first base panel depicting a pet door, a locking mechanism, and an orientation system.

With reference to FIG. 8, first base panel 110 defines a pet door opening 115. Pet door opening 115 enables a pet to pass through pet door insert 100. Pet door 113 is mounted to first base panel 110 in a position and manner enabling pet door 113 to selectively cover pet door opening 115.

Pet door 113 may be locked in a position covering pet door opening 115 with lock mechanism 120 to restrict a pet from passing through pet door opening 115. Rather than being entirely restricted from moving away from a position covering pet door opening 115, lock mechanism 120 may restrict pet door 113 from moving in one direction while allowing pet door 113 to move in another direction.

For example, lock mechanism 120 may selectively restrict pet door 113 from moving inwards while allowing pet door 113 to move outwards. Restricting pet door 113 from moving inwards may be selected to restrict a pet or other animal outside a dwelling from passing through pet door opening 115 into a dwelling while allowing a pet to move outside the dwelling when desired. Alternatively, lock mechanism 120 may selectively restrict pet door 113 from moving outwards while allowing pet door 113 to move inwards. Restricting pet door 113 from moving outwards may be selected to restrict a pet inside a dwelling from passing through pet door opening 115 to the outside environment while allowing pets outside to return inside the dwelling when desired.

The size and shape of pet door opening 115 is selected to accommodate house cats passing through first base panel 110. However, the size and shape of the pet door opening may be tailored for different sized pets and different types of pets. For example, the pet door opening may be sized and shaped to accommodate larger or smaller pets, such as larger or smaller cats and/or larger or smaller dogs or other animals.

Pet Door

Pet door 113 functions to selectively cover pet door opening 115. By selectively covering pet door opening 115, pet door 113 keeps rain and pests from passing through pet door opening 115 into a dwelling. When selectively restricted from moving by lock mechanism 120, pet door 113 functions to restrict pet access through pet door opening 115.

Pet door 113 is configured to move between a pet door covered position, shown in FIGS. 1-4 and 8, and a pet door open position. In the pet door covered position, pet door 113 covers pet door opening 115. In the pet door open position, pet door opening 115 is unblocked, and a pet may pass through pet door opening 115.

Pet door 113 is moveably mounted to first base panel 110 within pet door opening 115. In particular, pet door 113 is pivotally mounted to first base panel 110 at a top of pet door opening 115. Pet door 113 pivots between the pet door closed position and two pet door open positions. One pet door open position occurs when pet door 113 pivots outwards away from the dwelling and the other pet door open position occurs when pet door 113 pivots inwards inside the dwelling.

Track

Track 114 functions to moveably support adjustment panel system 102 on base panel system 101. By moveably supporting adjustment panel system 102, track 114 facilitates pet insert 100 adjusting to fill the width of window opening 192.

Figure 2:
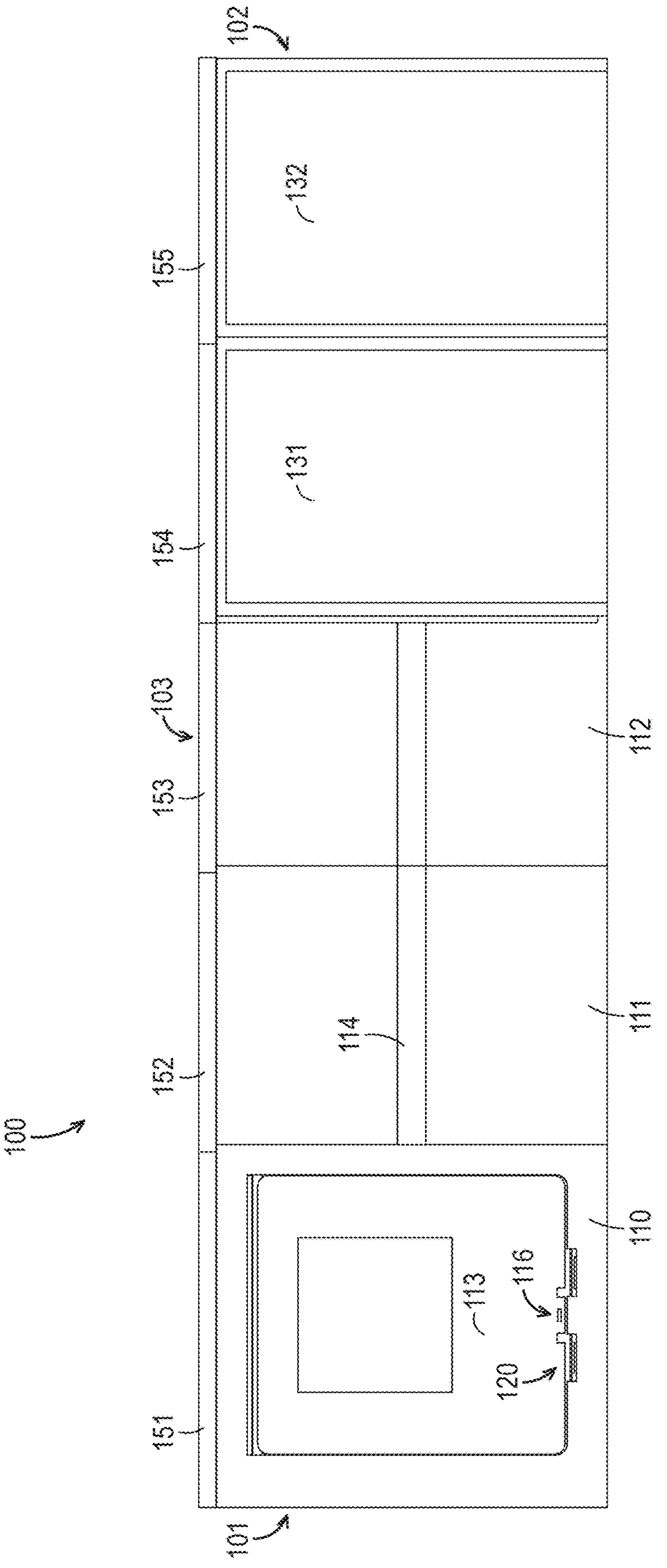
FIG. 2 is a rear elevation view of the pet door insert shown in FIG. 1 with an adjustment panel system extended laterally partially beyond a base panel system along a track.
Figure 3:
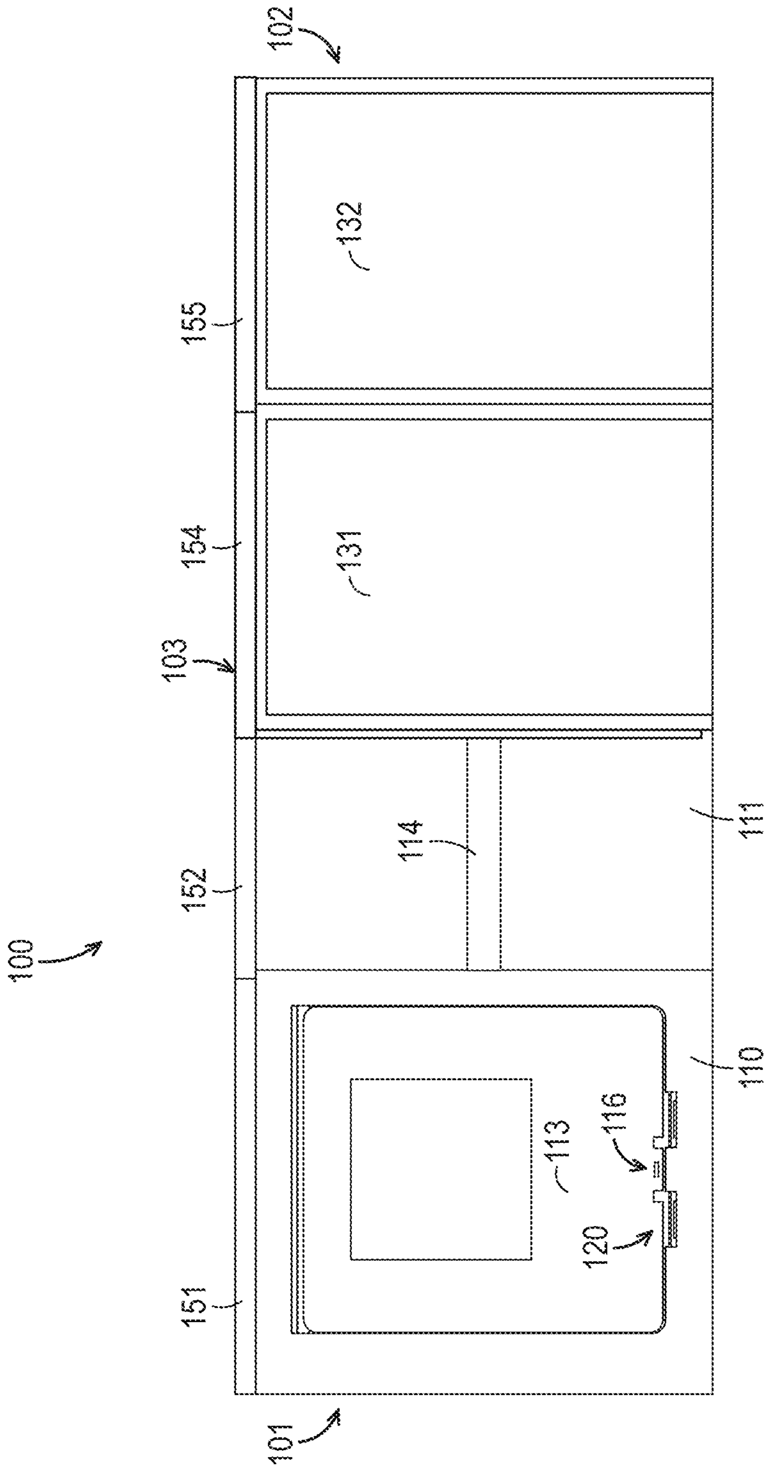
FIG. 3 is a rear elevation view of the pet door insert shown in FIG. 1 with an adjustment panel system moved behind a base panel system.

As shown in FIGS. 2, 3, and 5, track 114 extends longitudinally along a medial portion of second base panel 111 and third base panel 112. FIGS. 2, 3, and 5 demonstrate that track 114 extends longitudinally and continuously along medial portions of second base panel 111 and third base panel 112 when third base panel 112 is selectively coupled to second base panel 111.

As depicted in FIGS. 2 and 3, adjustment panel system 102 is moveably mounted on track 114. Adjustment panel system 102 defines a horizontal groove 133 adapted to receive track 114 to moveably mount adjustment panel system 102 on track 114. Horizontal groove 133 slides along track 114 to enable adjustment panel system 102 to translate relative to base panel system 101.

The size, shape, and position of the track may vary in different examples. The medial position of track 114 has been observed to effectively stabilize adjustment panel system 102 mounted on track 114. The medial position of track 114 enhances stability by supporting portions of adjustment panel system 102 above and below track 114.

Lock Mechanism

Lock mechanism 120 functions to selectively restrict pet door 113 from moving relative to first base panel 110 to maintain pet door 113 in the pet door closed position. Lock mechanism 120 is also adapted to selectively restrict pet door 113 from moving relative to first base panel 110 in one direction while allowing pet door 113 to move relative to first base panel 110 in an opposite direction.

For example, lock mechanism 120 may restrict pet door 113 from moving inwards while allowing pet door 113 to move outwards. Restricting pet door 113 from moving inwards exclusively restricts a pet or other animal outside a dwelling from passing through pet door opening 115 into a dwelling, but allows a pet to go outside through pet door opening 115 when needed. Alternatively, lock mechanism 120 may restrict pet door 113 from moving outwards while allowing pet door 113 to move inwards. Restricting pet door 113 from moving outwards exclusively restricts a pet inside a dwelling from going outside through pet door opening 115, but allows a pet outside a dwelling to go inside.

As shown in FIG. 8, lock mechanism 120 includes a first lock member 121 and a second lock member 122. Each lock member is moveably mounted to first base panel 110 near door opening 115. First lock member 121 is configured to selectively restrict pet door 113 from moving in a first direction, and second lock member 122 is configured to selectively restrict pet door 113 from moving in a second direction opposite the first direction.

As shown in FIG. 8, first lock member 121 includes a tab 123 projecting into door opening 115 and disposed on a first side of pet door 113. Second lock member 122 includes a tab 124 projecting into door opening 115 and disposed on a second side of pet door 113 opposite the first side of pet door 113. Pet door 113 defines two notches 125 and 126 configured to receive tabs 123 and 124, respectively, when the lock members are moved into positions where tabs 123 and 124 align with notches 125 and 126, respectively.

When first lock member 121 is moved to a position where tab 123 aligns with notch 125, pet door 113 may move freely past lock member 121. However, when first lock member 121 is moved to a position where tab 123 is not aligned with notch 125, pet door 113 abuts tab 123 when moved toward tab 123 and is thus restricted from moving past lock member 121. When second lock member 122 is moved to a position where tab 124 aligns with notch 126, pet door 113 may move freely past lock member 122. Pet door 113 is restricted from moving past second lock member 122 when second lock member 122 is moved into a position where tab 124 is not aligned with notch 126 and abuts pet door 113.

Orientation Mechanism

Orientation mechanism 116 is configured to selectively maintain pet door 113 in the pet door closed position by default. In particular, orientation mechanism 116 maintains pet door 113 in the pet door closed position until pet door 113 is acted on above a threshold force to move the pet door towards a door open position. The threshold force necessary to move pet door 113 is selected to correspond with the force a pet can comfortably exert on pet door 113 while still withstanding forces from wind or typical pressure imbalances between the inside and outside of a dwelling.

As shown in FIG. 8, orientation mechanism 116 includes a first magnet 117 and a second magnet 118. First magnet 117 is mounted to pet door 113 and second magnet 118 is mounted to first base panel 110 proximate pet door opening 115. The magnets are proximate each other, aligned, and magnetically coupled when pet door 113 is in the closed position. The magnetic coupling between first magnet 117 and second magnet 118 functions to maintain pet door 113 in the closed position until pet door 113 is pressed on with a force sufficient to overcome the magnetic coupling force between first magnet 117 and second magnet 118.

The orientation mechanism is an optional feature not present in all base panel system examples. In some examples, orientation mechanisms without magnets are used to keep the pet door oriented in a closed position by default. The orientation mechanism may be any currently known or later developed type of mechanism operable to keep the pet door oriented in a closed position by default.

Adjustment Panel System

Adjustment panel system 102 cooperates with base panel system 101 to cover window opening 192 when sash 191 is moved upwards away from bottom frame 193. In particular, adjustment panel system 102 functions to adjustably fill the width of window opening 192.

As can be seen in FIGS. 1-4, adjustment panel system 102 is moveably mounted on track 114. Adjustment panel system 102 is adapted to translate relative to base panel system 101. Adjustment panel system 102 translating relative to base panel system 101 adjusts the effective length of pet door insert 100.

Figure 4:
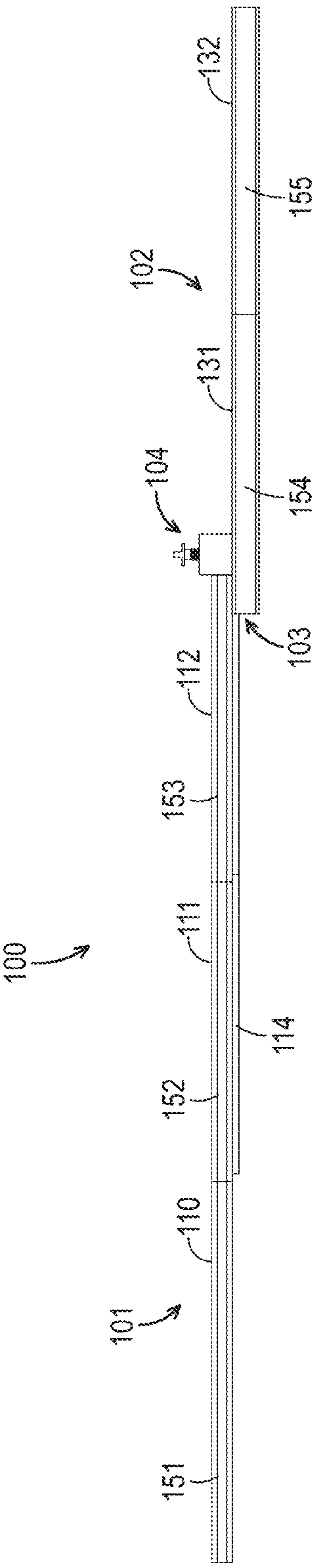
FIG. 4 is a top view of the pet door insert shown in FIG. 1.

As apparent from FIGS. 3 and 4, adjustment panel system 102 may be translated towards first base panel 110 and overlap base panel system 101 to yield a more compact configuration for pet door insert 100. Adjustment panel system 102 may be translated closer to first base panel 110 than depicted in FIG. 3 to entirely overlap second base panel 111 and third base panel 112. Adjustment panel system 102 overlapping second base panel 111 and third base panel 112 represents a compact position.

An extended position of adjustment panel system 102 occurs when adjustment panel system 102 translates away from first base panel 110 and extends longitudinally beyond base panel system 101 to a given extent. FIGS. 1, 2, and 4 depict adjustment panel system 102 in extended positions.

As shown in FIGS. 1-4 and 6, adjustment panel system 102 includes a first adjustment panel 131 and a second adjustment panel 132. In some examples, the adjustment panel system includes additional or fewer panels.

Figure 6:
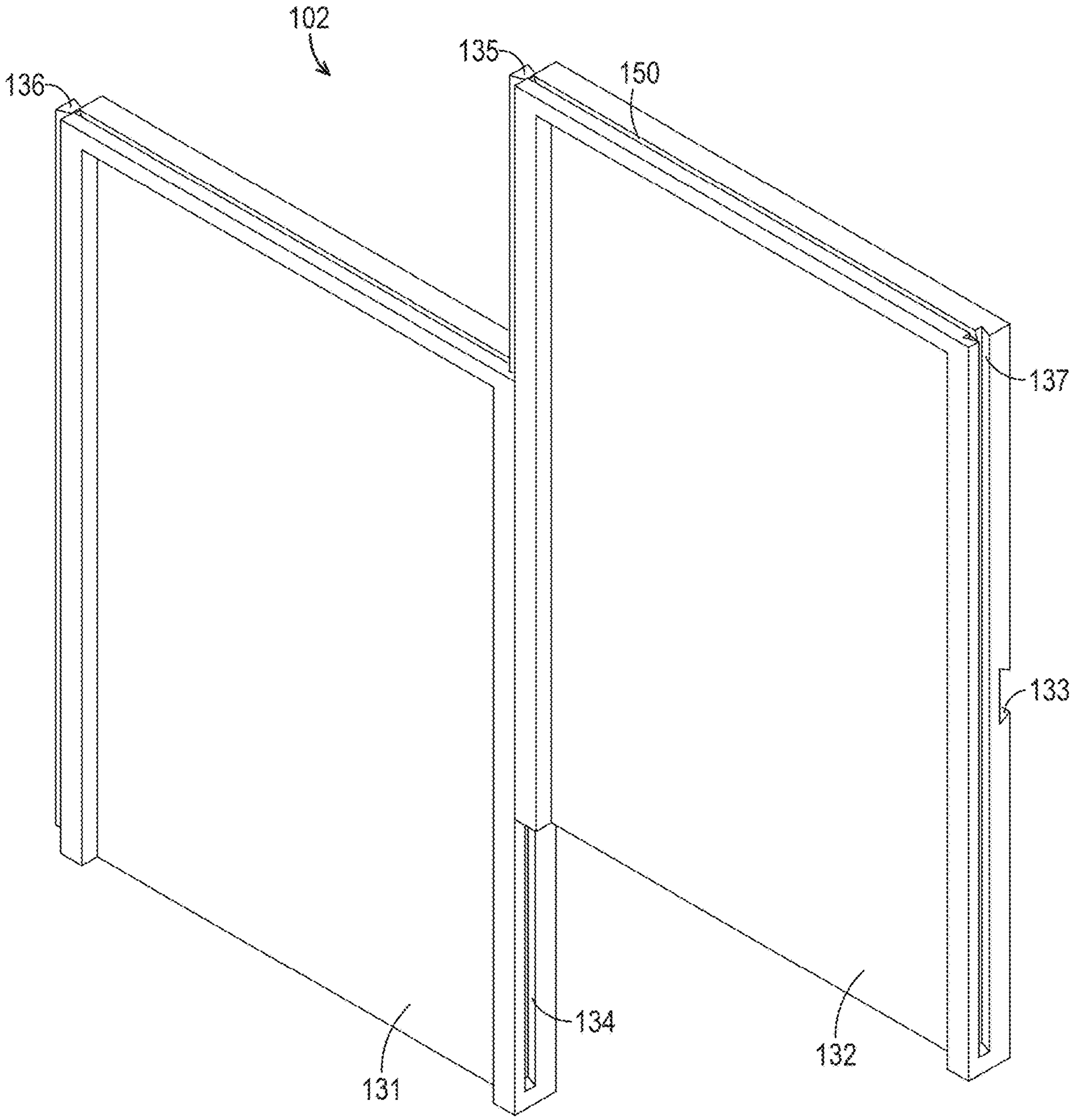
FIG. 6 is a perspective view of the adjustment panel system depicting a second adjustment panel partially attached to a first adjustment panel via a coupling groove extending vertically on a lateral side of the first adjustment panel.

As apparent from FIG. 6, second adjustment panel 132 may selectively couple to first adjustment panel 131. First adjustment panel 131 defines a coupling groove 134 extending vertically on a lateral side of first adjustment panel 131. Coupling groove 134 facilitates selectively coupling second adjustment panel 132 to first adjustment panel 131.

As shown in FIG. 6, second adjustment panel 132 defines a tongue 135 on a lateral side of the second adjustment panel 132 proximate coupling groove 134. Tongue 135 is complementarily configured with coupling groove 134. Second adjustment panel 132 selectively couples to first adjustment panel 131 when coupling groove 134 selectively receives tongue 135.

The reader can see in FIG. 6 that first adjustment panel 131 defines a tongue 136 on a lateral side opposite coupling groove 134. Further, second adjustment panel 132 defines a coupling groove 137 on a lateral side opposite tongue 135. Tongue 136 and/or coupling groove 137 enable a third adjustment panel to be selectively coupled to first adjustment panel or second adjustment panel, respectively, if additional length for the adjustment panel system is desired.

First adjustment panel 131 and second adjustment panel 132 each define a horizontal groove 133. Horizontal groove 133 extends longitudinally along a medial portion of adjustment panel 131 and 132. In particular, horizontal groove 133 extends longitudinally and continuously along medial portions of adjustment panels 131 and 132 when second adjustment panel 132 is selectively coupled to first adjustment panel 131.

Horizontal groove 133 is complementarily configured with track 114 to enable horizontal groove 133 to selectively receive track 114. Horizontal groove 133 selectively receiving track 114 selectively mounts adjustment panel system 102 to base panel system 101. Track 114 may slide within horizontal groove 133 to enable adjustment panel system 102 to translate relative to base panel system 101 between compact and extended positions.

Weather Seal System

Weather seal system 103 functions form a seal between base panel system 101 and sash 191. Weather seal system 103 also serves to form a seal between adjustment panel system 102 and sash 191. Weather seal system 103 is configured to modularly accommodate pet door insert 100 in different width configurations.

As shown in FIGS. 1-4, weather seal system 103 selectively mounts to base panel system 101 and to adjustment panel system 102. With reference to FIGS. 5 and 6, the reader can see that base panels 111 and 112 and adjustment panels 131 and 132 define top grooves 150. First base panel 110 also defines a top groove.

Top grooves 150 are configured to receive tongues defined by the bottom of weather seal members 151-155. The tongues of the weather seal members 151-154 selectively insert into top grooves 150 of base panels 110-112 and adjustment panels 131 and 132. When the tongues insert into top grooves 150, weather seal members 151-155 selectively mount to base panels 110-112 and to adjustment panels 131 and 132, respectively.

Significantly, weather seal system 103 includes separate seal members. In the present example, as shown most clearly in FIG. 2, weather seal system 103 includes a first seal member 151, a second seal member 152, a third seal member 153, a fourth seal member 154, and a fifth seal member 155. However, the weather seal system may include additional or fewer seal members in different examples. The number of seal members will typically correspond to the number of panels collectively included in the base panel system and the adjustment panel system.

Seal members 151-155 are formed from a pliable, rubber material. However, the seal members may be formed from any currently known or later developed material effective to form seals in window applications. The size and shape of the seal members may vary from the size and shape depicted in FIGS. 1-4.

Anchor

Anchor 104 is configured to selectively restrict adjustment panel system 102 moving relative to base panel system 101. By selectively restricting adjustment panel system 102 from moving relative to base panel system 101, anchor 104 allows pet door insert 100 to maintain a desired width within window opening 192. Pet insert 100 maintaining a desired width within window opening 192 helps keep pet door insert 100 securely positioned and resists unauthorized access through window 190.

As shown in FIGS. 1 and 4, anchor 104 selectively mounts to adjustment panel system 102 in horizontal groove 133. In particular, anchor 104 is configured to slide within horizontal groove 133 into a position abutting base panel system 101. Anchor 104 is configured to selectively maintain its position within the horizontal groove 133 abutting base panel system 101. Anchor 104 maintaining its abutting position restricts adjustment panel system 102 moving towards base panel system 101.

Figure 7A:
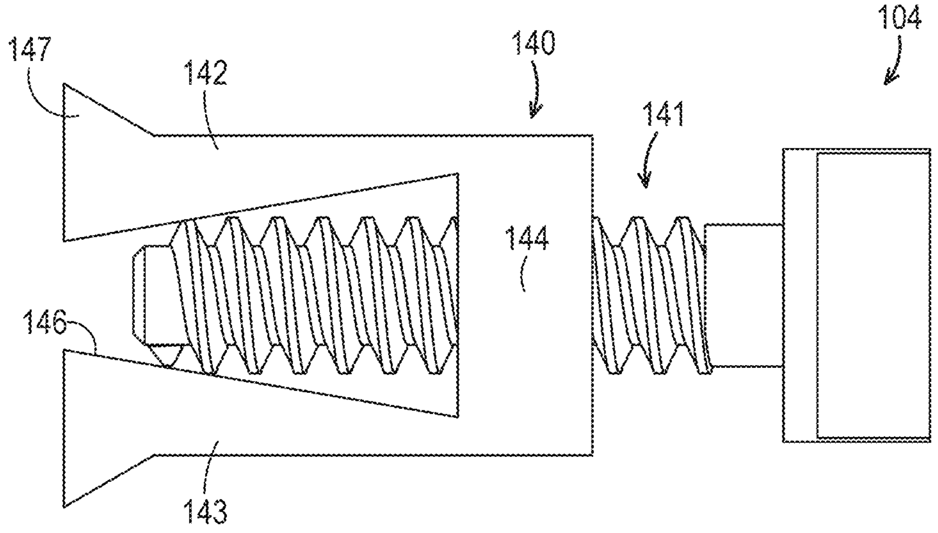
FIG. 7A is a side elevation view of an anchor of the pet door insert depicting a threaded shaft disposed between jaws to selectively expand the jaws.
Figure 7B:
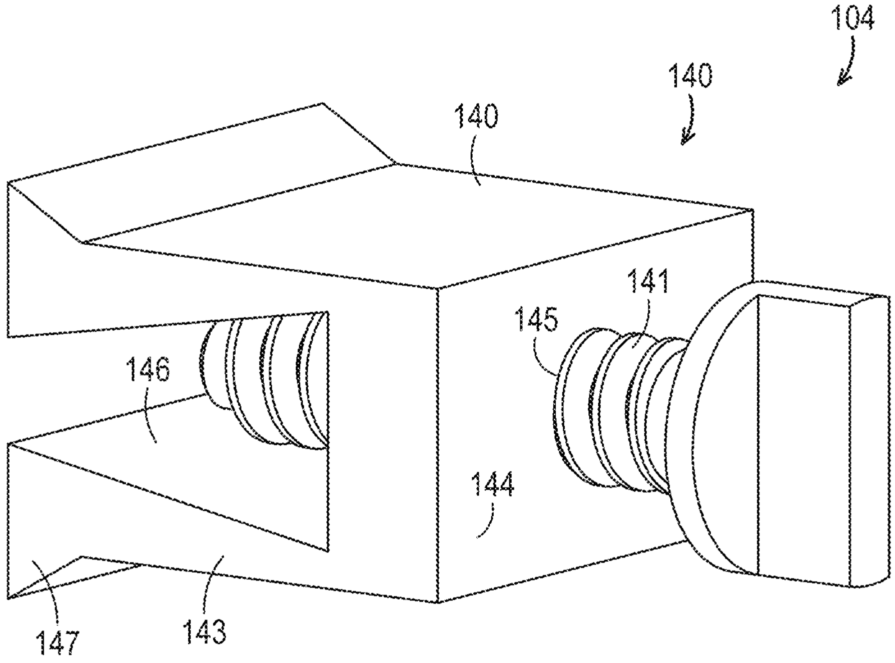
FIG. 7B is a side elevation view of the anchor of the pet door insert depicting the threaded shaft disposed between jaws to selectively expand the jaws.

Anchor 104 maintains its position in horizontal groove 133 by selectively expanding within horizontal groove 133. As shown in FIGS. 7A and 7B, anchor 104 includes a jaw member 140 and an actuator 141. Actuator 141 operates to selectively expand jaw member 140 to cause anchor 104 to selectively expand within horizontal groove 133.

As depicted in FIGS. 7A and 7B, jaw member 140 includes a first jaw 142, a second jaw 143, and a base 144. First jaw 142 and second jaw 143 are integrally coupled to base 144. At an opposite end of jaw member 140 opposite base 144, first jaw 142 is spaced from second jaw 143.

Jaws 142 and 143 define outward pointing teeth 147 at the end opposite base 144. Teeth 147 selectively engage horizontal groove 133 when jaws 142 and 143 are selectively moved apart by actuator 141.

Base 144 defines a threaded bore 145 through which actuator 141 extends and to which actuator 141 threadingly mounts. Actuator 141 and threaded bore 145 are complementarily threaded. The reader can see in FIGS. 7A and 7B that first jaw 142 and second jaw 143 define tapered surfaces 146 between them. Tapered surfaces 146 interact with actuator 141 to selectively adjust the spacing between first jaw 142 and second jaw 143.

Actuator 141 selectively adjusts the spacing between first jaw 142 and second jaw 143 by pressing against tapered surfaces 146. As shown in FIGS. 7A and 7B, actuator is threadingly mounted to base 144 at threaded bore 145. Actuator 141 extends through threaded bore 145 to press against tapered surfaces 146.

The further actuator 141 extends beyond base 144, the further apart jaws 142 and 143 expand on account of tapered surfaces 146. The reader can see in FIG. 7A that the spacing between tapered surfaces 146 decreases as a function of distance from base member 144. The decreased spacing of tapered surfaces 146 causes actuator 141 to expand jaw member 140 to a greater extent the further actuator 141 extends through base 144.

Additional Embodiment

With reference to FIGS. 9, 10A, and 10B, the discussion will now focus on an additional pet door insert embodiment.

The additional embodiment includes many similar or identical features to pet door insert 100. Thus, for the sake of brevity, each feature of the additional embodiment below is not redundantly explained. Rather, key distinctions between the additional embodiment and pet door insert 100 are described in detail and the reader should reference the discussion above for features substantially similar between the different pet door insert examples.

Embodiment Two

Turning attention to FIGS. 9, 10A, and 10B, a second example of a pet door insert, pet door insert 200, will now be described. As can be seen in FIG. 9, pet door insert 200 includes a base panel system 201, an adjustment panel system 202, a weather seal system 203, and an anchor 204.

A key distinction between pet door insert 200 and pet door insert 100 is that pet door insert 200 is oriented vertically instead of horizontally. Pet door insert 200 is configured to vertically adjust its height to fill open space of door opening 292 created by door member 291 sliding away from a door frame 293. The height of pet door insert 200 is adjusted by selectively moving adjustment panel system 202 relative to base panel system 201 via the same tongue-and-groove system described above for pet door insert 100. Additionally or alternatively, panels may be selectively added or removed from base panel system 201 and/or adjustment panel system 202 to adjust the height of pet door insert 200.

Anchor 204 represents another distinction between pet door insert 200 and pet door insert 100. As shown in FIGS. 10A and 10B, jaws 242 and 243 are flat proximate base 244 rather than tapered like tapered surfaces 146 of jaws 142 and 143. Further, jaws 242 and 243 define inward pointing teeth 247 rather than outward pointing teeth 147.

Unlike anchor 104 that fits within horizontal groove 133, anchor 204 selectively couples to track 214. Teeth 247 selectively engage track 214 when jaws 242 and 243 are pressed towards each other by actuator 241. When anchor 204 selectively couples to track 214 in a position abutting adjustment panel system 202, adjustment panel system 202 is restricted from moving towards base panel system 201. Expressed another way, anchor 204 maintains the position of adjustment panel system 202 relative to base panel system 201 when anchor 204 selectively mounts to track 214.

The reader can see in FIGS. 10A and 10B that actuator 241 extends through openings 245 defined in jaw members 242 and 243 rather than through an opening defined in a base 244. In the example shown in FIGS. 10A and 10B, actuator 241 selectively adjusts the spacing between jaw members 242 and 243 by selectively compressing jaw members 242 and 243 rather than by pressing against tapered surfaces. When actuator 241 selectively compresses jaw members 242 and 243, teeth 247 engage track 214 from opposite sides of track 214 and secure anchor 204 to track 214.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A pet door insert for a window comprising:

a base panel system including:

a first base panel defining a pet door opening;

a second base panel coupled to the first base panel along a first lateral side of the second base panel;

a pet door moveably mounted to the first base panel within the pet door opening and configured to move between a pet door covered position covering the pet door opening and a pet door open position allowing a pet to pass through the pet door opening;

a track extending longitudinally along a medial portion of the second base panel; and an adjustment panel system moveably mounted on the track and adapted to translate relative to the base panel system to adjust the effective length of the pet door insert, the adjustment panel system overlapping the base panel system in a compact position and extending longitudinally beyond the base panel system in an extended position, the adjustment panel system including:

a first adjustment panel defining a horizontal groove extending longitudinally along a medial portion of the first adjustment panel, the horizontal groove being complementarily configured with the track and selectively receiving the track to selectively mount the adjustment panel system to the base panel system.

2. The pet door insert of claim 1, further comprising a weather seal system selectively mounted to the base panel system and the adjustment panel system.

3. The pet door insert of claim 2, wherein the weather seal system includes separate seal members, the separate seal members including:

a first seal member selectively mounted to the base panel system; and a second seal member selectively mounted to the adjustment panel system.

4. The pet door insert of claim 1, wherein the base panel system further includes a third base panel selectively mounted to a second lateral side of the second base panel opposite the first lateral side.

5. The pet door insert of claim 4, wherein:

the second base panel defines a coupling groove extending vertically on the second lateral side of the second base panel;

the third base panel defines a tongue on a longitudinal side of the third base panel proximate the coupling groove defined in the second base panel, the tongue being complementarily configured with the coupling groove; and the coupling groove selectively receives the tongue to selectively couple the third base panel to the second base panel.

6. The pet door insert of claim 4, wherein the track extends longitudinally and continuously along a medial portion of both the second base panel and the third base panel when the third base panel is selectively coupled to the second base panel.

7. The pet door insert of claim 1, wherein the adjustment panel system further includes a second adjustment panel selectively coupled to the first adjustment panel.

8. The pet door insert of claim 7, wherein:

the first adjustment panel defines a coupling groove extending vertically on a lateral side of the first adjustment panel;

the second adjustment panel defines a second tongue complementarily configured with the coupling groove on a lateral side of the second adjustment panel proximate the coupling groove; and the coupling groove selectively receives the second tongue to selectively couple the second adjustment panel to the first adjustment panel.

9. The pet door insert of claim 7, wherein the horizontal groove extends longitudinally and continuously along a medial portion of both the first adjustment panel and the second adjustment panel when the second adjustment panel is selectively coupled to the first adjustment panel.

10. The pet door insert of claim 1, wherein:

the adjustment panel system further includes a second adjustment panel selectively coupled to the first adjustment panel; and the weather seal system includes separate seal members, the separate seal members including:

a first seal member selectively mounted to the first base panel;

a second seal member selectively mounted to the second base panel;

a third seal member selectively mounted to the first adjustment panel; and a fourth seal member selectively mounted to the second adjustment panel.

11. The pet door insert of claim 1, further comprising an anchor selectively mounted to the adjustment panel system and configured to selectively restrict the adjustment panel system from moving relative to the base panel system.

12. The pet door insert of claim 11, wherein:

the anchor selectively mounts to the horizontal groove;

the anchor is configured to slide within the horizontal groove into a position abutting the base panel system; and the anchor is configured to selectively maintain its position within the horizontal groove abutting the base panel system to restrict the adjustment panel system moving relative to the base panel system.

13. The pet door insert of claim 12, wherein the anchor includes:

a jaw member including:

a first jaw; and a second jaw spaced from the first jaw; and an actuator moveably mounted to the jaw member between the first jaw and the second jaw, the actuator being configured to change the space between the first jaw and the second jaw.

14. The pet door insert of claim 13, wherein:

the first jaw and the second jaw define tapered surfaces between them; and the actuator pressing against the tapered surfaces when selectively moved relative to the jaw member changes the spacing between the first jaw and the second jaw.

15. The pet door insert of claim 13, wherein the actuator and the jaw member are complementarily threaded.

16. The pet door insert of claim 1, wherein the pet door insert is adapted to fit within a window frame of the window when a sash of the window is moved relative to the window frame to create an opening to receive the pet door insert.

17. The pet door insert of claim 16, wherein the pet door insert covers the opening when the sash abuts the pet door insert disposed in the window frame.

18. The pet door insert of claim 17, wherein the pet door insert and the sash cooperate to seal the window when the sash abuts the pet door insert disposed in the window frame.

19. The pet door insert of claim 1, wherein the base panel system includes a lock mechanism configured to selectively restrict the pet door from moving relative to the first base panel to maintain the pet door in the pet door closed position.

20. The pet door insert of claim 1, wherein the base panel system includes an orientation mechanism configured to selectively maintain the pet door in the pet door closed position until the pet door is acted on above a threshold force to move the pet door towards a door open position.

* * * * *